United States Patent
Pingel et al.

(10) Patent No.: US 8,055,375 B2
(45) Date of Patent: Nov. 8, 2011

(54) ANALYTICAL GENERATOR OF KEY PERFORMANCE INDICATORS FOR PIVOTING ON METRICS FOR COMPREHENSIVE VISUALIZATIONS

(75) Inventors: Jan Pingel, New Berlin, WI (US); Micheal John Pantaleano, Willoughby, OH (US); Bruce Gordon Fuller, Edmonton (CA); Robert Joseph McGreevy, Oswego, IL (US); Ian Edward Tooke, Innisfil (CA); Kevin John Albert, Wauwatosa, WI (US); John Joseph Baier, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 402 days.

(21) Appl. No.: 12/242,140

(22) Filed: Sep. 30, 2008

(65) Prior Publication Data
US 2010/0082125 A1   Apr. 1, 2010

(51) Int. Cl.
*G06F 19/00* (2011.01)
*G05B 19/18* (2006.01)

(52) U.S. Cl. ........ 700/173; 700/159; 700/160; 700/161; 700/174; 700/180; 700/47; 700/28

(58) Field of Classification Search ............ 700/47, 700/28, 14, 159, 161, 160, 108, 173, 174; 382/159
See application file for complete search history.

(56) References Cited

U.S. PATENT DOCUMENTS

| | | | | |
|---|---|---|---|---|
| 4,027,245 A * | 5/1977 | Bourrat et al. | ......... | 700/163 |
| 4,393,450 A * | 7/1983 | Jerard | ......... | 700/163 |
| 4,409,659 A * | 10/1983 | Devine | ......... | 700/174 |
| 4,509,126 A * | 4/1985 | Olig et al. | ......... | 700/173 |
| 4,547,847 A * | 10/1985 | Olig et al. | ......... | 700/173 |
| 5,339,257 A * | 8/1994 | Layden et al. | ......... | 700/174 |
| 5,465,221 A * | 11/1995 | Merat et al. | ......... | 700/173 |
| 5,566,092 A * | 10/1996 | Wang et al. | ......... | 700/174 |
| 5,825,361 A | 10/1998 | Rubin | ......... | 700/83 |
| 5,871,391 A * | 2/1999 | Pryor | ......... | 700/174 |
| 6,081,750 A | 6/2000 | Hoffberg | ......... | 700/17 |
| 6,400,998 B1 * | 6/2002 | Yamazaki et al. | ......... | 700/86 |
| 6,401,004 B1 * | 6/2002 | Yamazaki et al. | ......... | 700/174 |
| 6,496,751 B1 * | 12/2002 | Salvo et al. | ......... | 700/174 |
| 6,502,007 B1 * | 12/2002 | Kanamoto et al. | ......... | 700/173 |
| 6,666,049 B1 * | 12/2003 | Katende et al. | ......... | 62/656 |
| 6,883,030 B1 | 4/2005 | Leins | ......... | 700/17 |
| 6,961,637 B2 * | 11/2005 | Scherer | ......... | 700/173 |
| 6,975,913 B2 | 12/2005 | Kreidler | ......... | 700/96 |
| 7,032,816 B2 * | 4/2006 | Markham et al. | ......... | 235/376 |
| 7,035,877 B2 * | 4/2006 | Markham et al. | ......... | 707/999.2 |
| 7,103,452 B2 | 9/2006 | Retsina | ......... | 700/291 |
| 7,188,169 B2 | 3/2007 | Buus | ......... | 709/224 |
| 7,246,014 B2 | 7/2007 | Forth | ......... | 702/60 |

(Continued)

*Primary Examiner* — Kakali Chaki
*Assistant Examiner* — Kelvin Booker
(74) *Attorney, Agent, or Firm* — Turocy & Watson LLP; William R. Walbrun; John M. Miller

(57) ABSTRACT

A guidance system of an industrial process captures process parameter data that is correlated with a human-machine interface (HMI) in order to learn how an experienced operator selects visualizations of key performance indicators (KPI) in order to take a corrective action to address an abnormal or non-optimal performance condition. Such solution learning can be invoked to recognize onset of another similar occurrence and responding by suggesting visualizations utilized by the experienced operator to diagnose the problem. Analytics can further determine which visualizations provided useful information relative to the problem. In addition, the corrective action can be suggested or automatically implemented.

20 Claims, 9 Drawing Sheets

U.S. PATENT DOCUMENTS

| | | | |
|---|---|---|---|
| 7,269,569 B2 | 9/2007 | Spira | 705/7 |
| 7,357,298 B2 * | 4/2008 | Pokorny et al. | 235/375 |
| 7,380,213 B2 * | 5/2008 | Pokorny et al. | 700/96 |
| 7,395,122 B2 * | 7/2008 | Kreidler et al. | 700/174 |
| 7,401,728 B2 * | 7/2008 | Markham et al. | 235/376 |
| 7,480,709 B2 | 1/2009 | Callaghan | 700/17 |
| 7,676,294 B2 * | 3/2010 | Baier et al. | 700/108 |
| 7,809,656 B2 * | 10/2010 | Baier et al. | 706/12 |
| 7,937,164 B2 * | 5/2011 | Samardzija et al. | 700/174 |
| 2001/0027354 A1 * | 10/2001 | Kakino et al. | 700/173 |
| 2002/0091460 A1 * | 7/2002 | Allen | 700/173 |
| 2003/0023336 A1 * | 1/2003 | Kreidler et al. | 700/174 |
| 2003/0150909 A1 * | 8/2003 | Markham et al. | 235/376 |
| 2004/0128019 A1 * | 7/2004 | Ikeda et al. | 700/174 |
| 2005/0021158 A1 * | 1/2005 | De Meyer et al. | 700/67 |
| 2006/0085091 A9 * | 4/2006 | Kiesel et al. | 700/174 |
| 2006/0149407 A1 * | 7/2006 | Markham et al. | 700/108 |
| 2009/0089682 A1 * | 4/2009 | Baier et al. | 715/751 |
| 2009/0089709 A1 * | 4/2009 | Baier et al. | 715/817 |
| 2009/0093905 A1 * | 4/2009 | Otsuki et al. | 700/174 |
| 2009/0228129 A1 * | 9/2009 | Moyne et al. | 700/102 |
| 2010/0050103 A1 * | 2/2010 | Husoy et al. | 700/9 |
| 2010/0079488 A1 * | 4/2010 | McGreevy et al. | 345/629 |
| 2010/0082143 A1 * | 4/2010 | Pantaleano et al. | 706/46 |
| 2010/0082292 A1 * | 4/2010 | Pantaleano et al. | 700/83 |
| 2010/0114354 A1 * | 5/2010 | Lee | 700/173 |

* cited by examiner

ANALYTICAL GENERATOR OF KEY PERFORMANCE INDICATORS FOR PIVOTING ON METRICS FOR COMPREHENSIVE VISUALIZATIONS

TECHNICAL FIELD

The subject invention relates generally to industrial control systems, and more particularly to visualization systems that interact with industrial control systems based in part on collecting and archiving operator solutions to production and operational problems.

BACKGROUND

Industrial controllers are special-purpose computers utilized for controlling industrial processes, manufacturing equipment, and other factory automation, such as data collection or networked systems. One type of industrial controller at the core of an industrial control system is a logic processor such as a programmable logic controller (PLC) or personal computer (PC) based controller. Programmable logic controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs.

Connected to the PLC are input/output (I/O) devices. I/O devices provide connection to the PLC for both automated data collection devices such as limit switches, photoeyes, load cells, thermocouples, etc. and manual data collection devices such as keypads, keyboards, pushbuttons, etc. Differences in PLCs are typically dependent on number of I/O they can process, amount of memory, number and type instructions and speed of the PLC central processing unit (CPU).

Another type of industrial controller at the core of an industrial control system is the process controller of a distributed control system (DCS). The process controller is typically programmed by a control engineer for continuous process control such as an oil refinery or a bulk chemical manufacturing plant. A control engineer typically configures control elements such as proportional-integral-derivative (PID) control loops to continuously sample the I/O data, known as the process variable, from the process, compare the process variable to a configured set point and output an error signal, proportional to the difference between the set point and the process variable, to the control device. The control device then adjusts the element controlling the process property, such as a valve in a pipe for flow control or a heating element in a distillation column for temperature control, in an attempt to minimize the error signal. As the DCS name implies, many process controllers are distributed around the process and are communicatively coupled to each other forming the overall control system.

Connected to the process controller are similar types of I/O devices as connected to the PLC and additionally, intelligent I/O devices more common to the process control industry. These intelligent devices have embedded processors capable of performing further calculations or linearization of the I/O data before transmission to the process controller.

A visualization system is generally connected to the industrial controller to provide a human-friendly view into the process instrumented for monitoring or control. The user of a visualization system configures one or more graphical displays representing some aspect of the process the industrial controller is controlling or monitoring. The graphical displays each contain a user configured number of data values collected from the I/O connected to the industrial controller and considered by the user as relevant to the particular graphical display or process area of interest. Other data points may be configured strictly for archival purposes or to generate reports related to interests such as production, downtime, operator efficiency, raw material usage, etc.

Automating control and human-machine interface (HMI) to achieve efficiency, quality, safety, performance, etc. generally requires expertise to be embodied in a model. Relationships between certain data parameters are determined in order to prompt an operator or to facilitate automatic control events. Often such models benefit from tendencies for setting up identical processing lines (e.g., batch, continuous, or discrete). Thus, the investment in such models can be realized across sites of an enterprise.

However, generally such models, if in existence at all, tend to be an incomplete solution. Production lines can be customized for particular applications. Substituted hardware can perform similarly, but not identically, to that which was modeled. Ambient parameters (e.g., humidity, temperature, etc.) can vary from location to location and from time to time within a facility. Materials input into a process can vary from batch to batch or from different suppliers. Further, relationships between certain parameters can go unappreciated during the development of a process model. Although increasingly data is available from ubiquitous integrated devices and sensors, the large amount of data does not necessarily enhance understanding of why an industrial process is departing from a desired optimum condition.

Compensating to an extent for the limitations in automated sensing and control, operators can become exceedingly skilled in detecting aberrations in an industrial process, perhaps accessing data from the HMI in an unexpected way in order to locate indications of where the problem originates. Other operators, though, such as with less experience and on another shift, can lack the intuition in order to identify such solutions.

SUMMARY

The following presents a simplified summary in order to provide a basic understanding of some aspects described herein. This summary is neither an extensive overview nor is intended to identify key/critical elements or to delineate the scope of the various aspects described herein. Its sole purpose is to present some concepts in a simplified form as a prelude to the more detailed description presented later.

In one aspect, a method guides an operator of an industrial process by learning from expertise of another operator. Parameter data of an industrial process are accessed. Human-machine interface (HMI) data is accessed and correlated with the stored parameter data. The method determines that accessed parameter data characterize a problem warranting operator intervention in the industrial process. Process visualization utilized by an operator and a subsequent control correction made by the operator are tracked. A solution is defined for future use comprised of a key performance indicator (KPI) indicative of the characterized problem, a visualization for the KPI, and a control correction that addresses the KPI.

In another aspect, an apparatus guides an industrial process. A first network interface accesses parameter data of an industrial process. A second network interface accesses human-machine interface (HMI) data correlated with the stored parameter data. A key performance indicator (KPI) guidance system determines that accessed parameter data characterize a problem warranting operator intervention in the industrial process, tracks a process visualization utilized by an operator and a subsequent control correction made by the operator, and defines a solution for future use comprised of a key performance indicator (KPI) indicative of the characterized problem, a visualization for the KPI, and a control correction that addresses the KPI.

In an additional aspect, an industrial process system comprises a process component that generates parameter data and a human-machine interface (HMI) that displays parameter data and provides operator controls for the process component. historical parameter data and HMI data storage. A first network interface accesses real-time parameter data of an industrial process. A second network interface accesses real-time HMI data correlated with the stored parameter data. A key performance indicator (KPI) guidance system communicates via the first and second network interfaces for determining that accessed parameter data characterize a problem warranting operator intervention in the industrial process, for tracking a process visualization utilized by an operator and a subsequent control correction made by the operator, and for defining a solution for future use comprised of a key performance indicator (KPI) indicative of the characterized problem, a visualization for the KPI, and a control correction that addresses the KPI.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
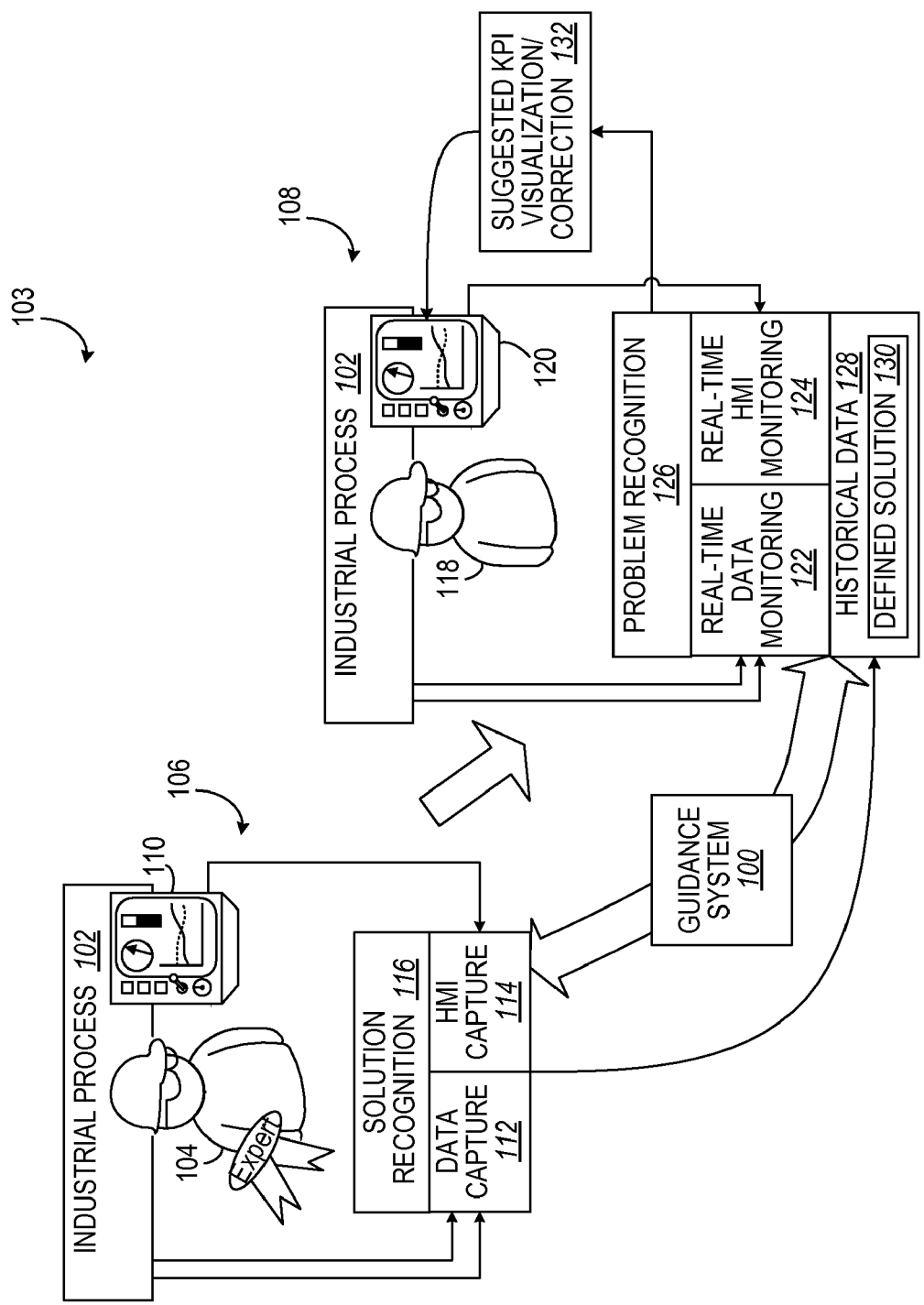
FIG. 1 illustrates a diagram of a key performance indicator (KPI) guidance system interacting with an industrial process and operators to learn from and pass on problem solving expertise.

A guidance system of an industrial process captures process parameter data that is correlated with a human-machine interface (HMI) in order to learn how an experienced operator selects visualizations of key performance indicators (KPI) in order to take a corrective action to address an abnormal or non-optimal performance condition. Such solution learning can be invoked to recognize onset of another similar occurrence and responding by suggesting visualizations utilized by the experienced operator to diagnose the problem. Analytics can further determine which visualizations provided useful information relative to the problem. In addition, the corrective action can be suggested or automatically implemented.

It is noted that as used in this application, terms such as "component," "display," "interface," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith. Additionally, it is noted that as used in this application, terms such as "system user," "user," "operator" and the like are intended to refer to the person operating the computer-related entity referenced above.

As used herein, the term to "infer" or "inference" refer generally to the process of reasoning about or inferring states of the system, environment, user, and/or intent from a set of observations as captured via events and/or data. Captured data and events can include user data, device data, environment data, data from sensors, sensor data, application data, implicit and explicit data, etc. Inference can be employed to identify a specific context or action, or can generate a probability distribution over states, for example. The inference can be probabilistic, that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is also noted that the interfaces described herein can include a Graphical User Interface (GUI) to interact with the various components for providing industrial control information to users. This can include substantially any type of application that sends, retrieves, processes, and/or manipulates factory input data, receives, displays, formats, and/or communicates output data, and/or facilitates operation of the enterprise. For example, such interfaces can also be associated with an engine, editor tool or web browser although other type applications can be utilized. The GUI can include a display having one or more display objects (not shown) including such aspects as configurable icons, buttons, sliders, input boxes, selection options, menus, tabs and so forth having multiple configurable dimensions, shapes, colors, text, data and sounds to facilitate operations with the interfaces. In addition, the GUI can also include a plurality of other inputs or controls for adjusting and configuring one or more aspects. This can include receiving user commands from a mouse, keyboard, speech input, web site, remote web service and/or other device such as a camera or video input to affect or modify operations of the GUI.

Additionally, it is also noted that the term industrial controller as used herein includes both PLCs and process controllers from distributed control systems and can include functionality that can be shared across multiple components, systems, and or networks. One or more industrial controllers can communicate and cooperate with various network devices across a network. This can include substantially any type of control, communications module, computer, I/O device, Human Machine Interface (HMI)) that communicate via the network which includes control, automation, and/or public networks. The industrial controller can also communicate to and control various other devices such as Input/Output modules including Analog, Digital, Programmed/Intelligent I/O modules, other programmable controllers, communications modules, and the like. The network (not shown) can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Referring initially to FIG. 1, a guidance system 100 operates within an industrial process 102 of an industrial enterprise 103 to learn from expertise of an operator 104 in a first scenario depicted at 106 to apply to a second scenario depicted at 108. These scenarios can on the same equipment or different equipment but within comparable configurations. Such learning can occur prospectively or be retroactively applied to historical data in order to target a specific situation currently sensed in the second scenario 108. In addition, a plurality of first scenarios 106 can be analyzed and weighted in order to give a plurality of investigative visualization recommendations or correct action suggestions/implementations.

In an illustrative aspect, in the first (learning) scenario 106, the expert operator 104 interacts with a human-machine interface (HMI) 110 that displays parameter data, such as key performance indicators (KPI), and alerts and receives control inputs from the operator 104. The parameter data received from the industrial process 102 are received by a data capture component 112. The HMI inputs and outputs ("HMI data") are received by an HMI capture component 114. A solution recognition component 116 learns from how the operator 104 interacts with the HMI 110 to address an abnormal condition or non-optimal performance.

Such learning can be triggered prospectively by automatically recognizing the abnormal/non-optimal condition by monitoring one or more key performance indicators (KPIs). Alternatively or in addition, such learning can be triggered by detecting an HMI alert given to the operator 104. Alternatively or in addition, such learning can be triggered retrospectively based upon a corrective action taken by the operator 104 with a search for one or more affected parameters. Alternatively or in addition, the first scenario 106 can comprise an historical occurrence that was previously not analyzed consistent with aspects herein but rather is analyzed in background of real time processing.

In an illustrative aspect, in the second (guidance) scenario 108, a novice operator 118 interacts with a human-machine interface (HMI) 120 that displays parameter data, such as key performance indicators (KPI), and alerts and receives control inputs from the novice operator 118. The parameter data received from the industrial process 102, which can be the same or similar equipment of the first scenario 106, are received by a real-time data monitoring component 122, which can further perform capture of the HMI data. The HMI inputs and outputs ("HMI data") are received by an HMI real-time monitoring component 124, which can further perform HMI data capture. A problem recognition component 126 recognizes an abnormal condition or non-optimal performance such as by analyzing the parameter data or the HMI data.

It should further be appreciated that the guidance system 100 can comprise a unitary system capable of both real time learning and historical learning as well as recognizing these conditions in subsequent real time situations, such as second scenario 108. Alternatively, these systems can be bifurcated with a first learning scenario 106 used to communicate solutions to one or more guidance scenarios 108. In the second scenario 108, an exemplary historical data storage component 128 can contain defined solutions 130 from the first scenario 106 that are determined real-time during the first scenario 106 or that are determined subsequently.

Upon recognizing the problem associated with one or more defined solution 130, the problem recognition component 126 can convey suggested KPI visualizations or control corrections 132 to the novice operator 118 via the HMI 120. Such visualizations can be weighted suggestions from a plurality of first learning scenarios 106, ranked by their efficacy and correlation to the second scenario 108.

Figure 2:
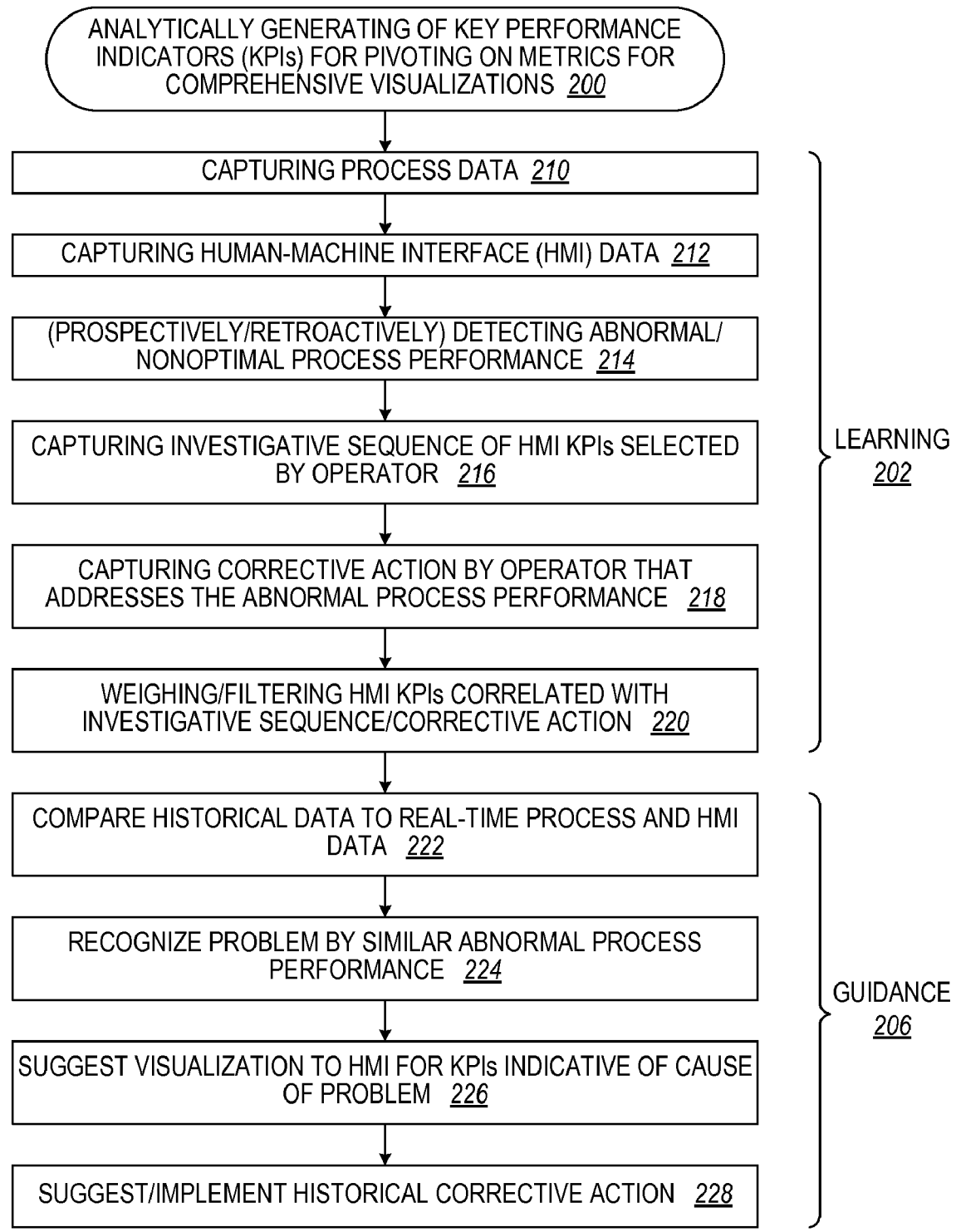
FIG. 2 illustrates a flow diagram of a methodology for analytically generating KPIs for pivoting on metrics for comprehensive visualizations.

Turning to FIG. 2, a methodology 200 is depicted for analytically generating key performance indicators (KPIs) for pivoting on metrics for comprehensive visualizations. A learning phase 202 is followed by a guidance phase 206. The learning phase 202 comprises blocks 210-220 and the guidance phase 206 comprises blocks 222-228. In block 210, process data is captured. In block 212, HMI data is captured. Prospectively or retroactively, an abnormal condition or non-optimal condition performance condition of an industrial process is detected (block 214). An operator is monitored to determine what investigative visualizations were selected in order to evaluate KPIs, with this information is captured (block 216). In block 218, corrective actions taken by the operator are corrected, which can entail monitoring HMI control inputs, video capture of user actions, capture of spoken or typed inputs by the operator. A resulting degree of success is determined so that the visualized KPIs and corrective actions can be given a weight as to their informative value for a subsequent occurrence (block 220).

In the guidance phase 206, historical data can be compared to real-time process and HMI data (block 222). A problem in the real-time data is recognized, such as a defined solution having characteristics of an underlying problem specified (block 224). Alternatively, a subset of key performance indicators in combination define states for which certain learned responses are defined. In block 226, visualizations for the HMI re suggested for KPIs indicative of the cause of the problem. In block 228, one or historical corrective actions are suggested or automatically implemented.

Figure 3:
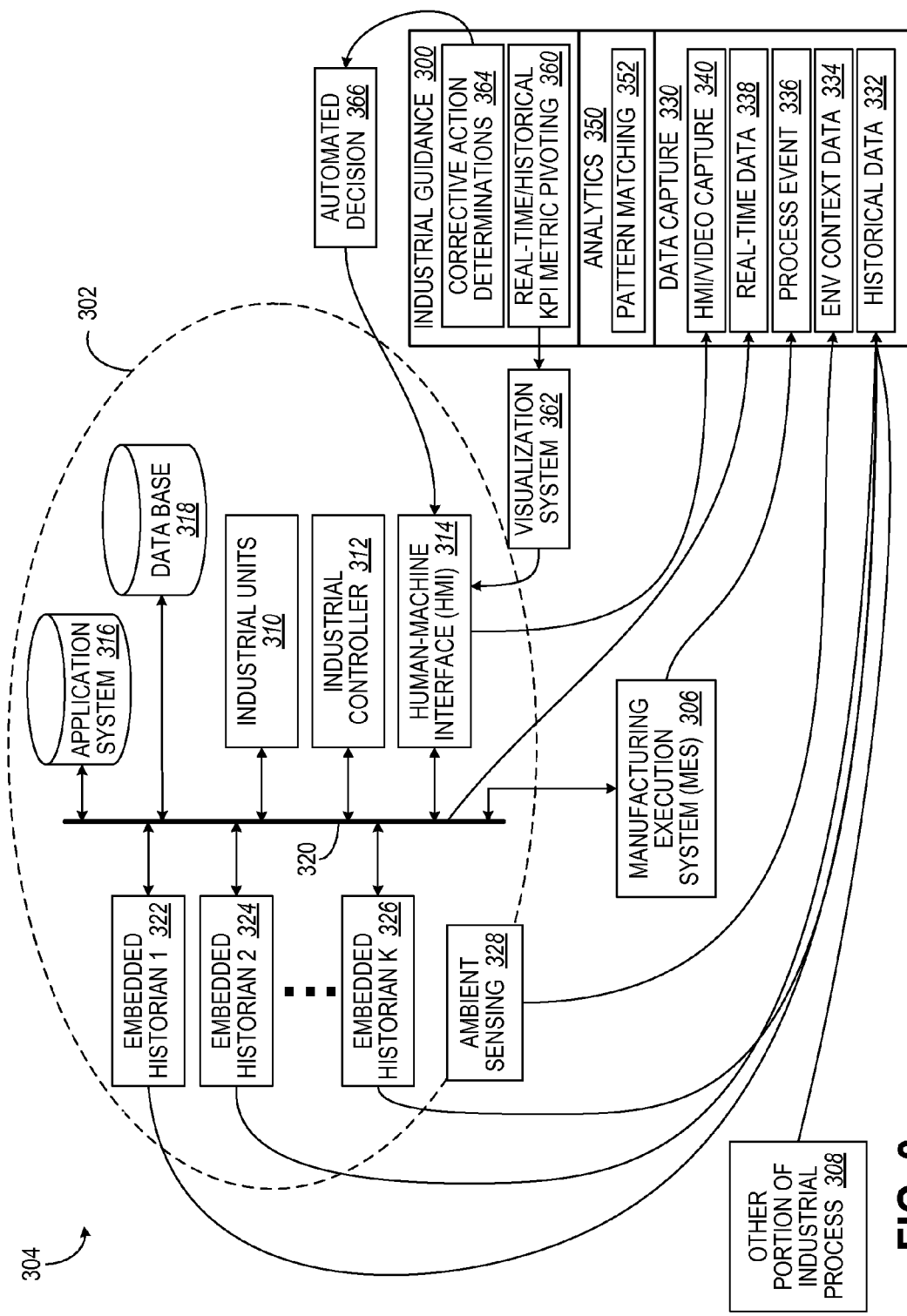
FIG. 3 illustrates a block diagram of an industrial process having embedded historians and a manufacturing execution system as well as other industrial processes that are monitored by an industrial guidance system, which further learns from and proposes solutions via a human-machine interface (HMI)

In FIG. 3, a guidance system 300 can interact with an industrial process 302 of an enterprise industrial process 304, as well as a manufacturing execution system 306 and other portions 308 of the enterprise industrial process 304. The industrial process is depicted as industrial units 310, industrial controller 312, HMI 314, application system storage 316, and data base 318 on a network bus 320. A plurality of embedded historians 322, 324, 326 reside on the network bus 320 or communicate with one or more of the other components of the industrial process 304 to capture process data. An ambient sensing component 328 can advantageously expand upon data regarding characteristics of the industrial process, such as by sensing humidity, vibration levels, temperature, barometric pressure, etc.

A data capture component 330 of the industrial guidance system 300, or an independent system upon which the industrial guidance system 300 provides additional functionality, has a historical data capture component 332 that receives historical process data from the historians 322-326 and data from other portions 308. An environmental context data component 334 captures the ambient conditions. The data capture component 330 can further be receiving process information at a process data component 336 from a production center, such as via the manufacturing execution system (ME) 306, such as identifying a type of input material, process event data, personnel/shift identifiers, time synchronization information, etc. The data capture component 330 can comprise a real-time data process data component 338 that receives process data, such as by communicating with network bus 320. An HMI/video capture component 340 can be interfaced to the HMI 314.

An analytics component 350 of the guidance system 300, or an independent system upon which the guidance system 300 provides additional functionality, can comprise a pattern matching component 352 that correlates real-time data to historical data to determine the applicability of solution device to a present scenario. Alternatively or in addition, the pattern matching can determine a weighting of closely KPIs correlate with real-time data The industrial guidance system 300 advantageously has a real-time versus historical KPI metric pivoting component 360 that supplies suggested KPIs to a visualization system 362, such as relaying guidance to HMI 314. A corrective action determination component 364 proposes learned actions weighted for efficacy and applicability that can be given to an automated decision component 366 for adjusting the industrial process 302.

Figure 4:
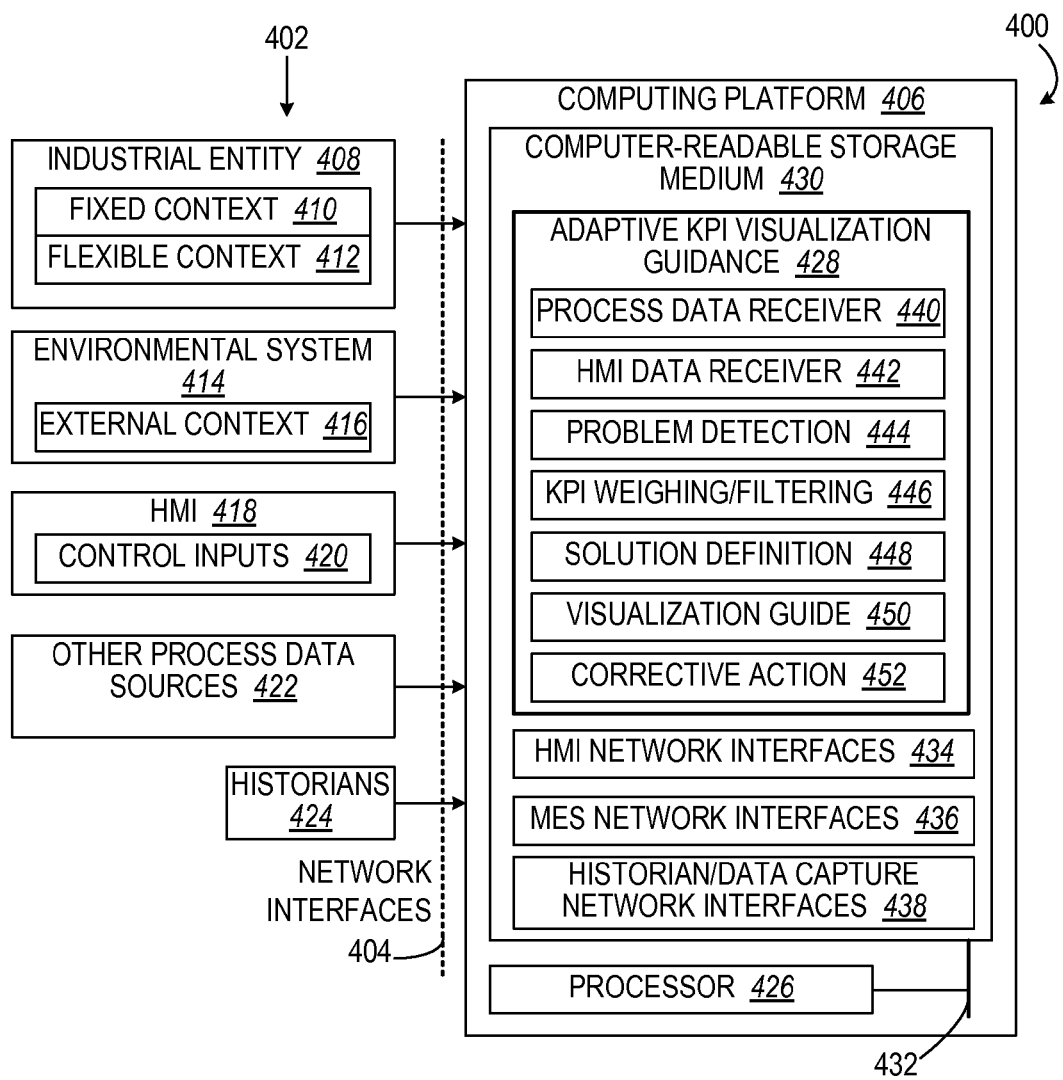
FIG. 4 illustrates a block of a computing platform for the industrial guidance system of FIG. 3.

In FIG. 4, a guidance system 400 can advantageously comprise a distributed architecture of enterprise components 402 interfaced across one or more network interfaces 404 to a computer platform 406. With regard to the enterprise components 402, an industrial entity (e.g., industrial controller, program control center, etc.) 408 can provided fixed content data provider 410 (e.g., KPIs defined for a category of industrial process recognized and standardized for visualization and control). The industrial entity 408 can also provide flexible context data provider 412 that allows the implementer of the industrial process to select other data parameters that can be learned as having bearing on normal or optimized control of the industrial process. An environmental system 414 with an external context provider 416, HMI component 418 with control inputs provider 420, other process data sources 422, and historians 424 are illustrated interfacing with the computer platform 406.

The computing platform 406 has one or more processors 426 that executes adaptive KPI visualization guidance modules 428 accessed on a computer-readable storage medium 430. These module 428 interact with the enterprise components 402 via HMI network interfaces 434, MES network interfaces 436, and historian/data capture network interfaces 438 resident in the storage medium (memory) 430. Exemplary modules 428 comprise a process data receiver 440, HMI data receiver 442, problem detection 444, KPI weighing/filtering 446, solution definition 448, visualization guide 450, and corrective action 452.

Figure 5:
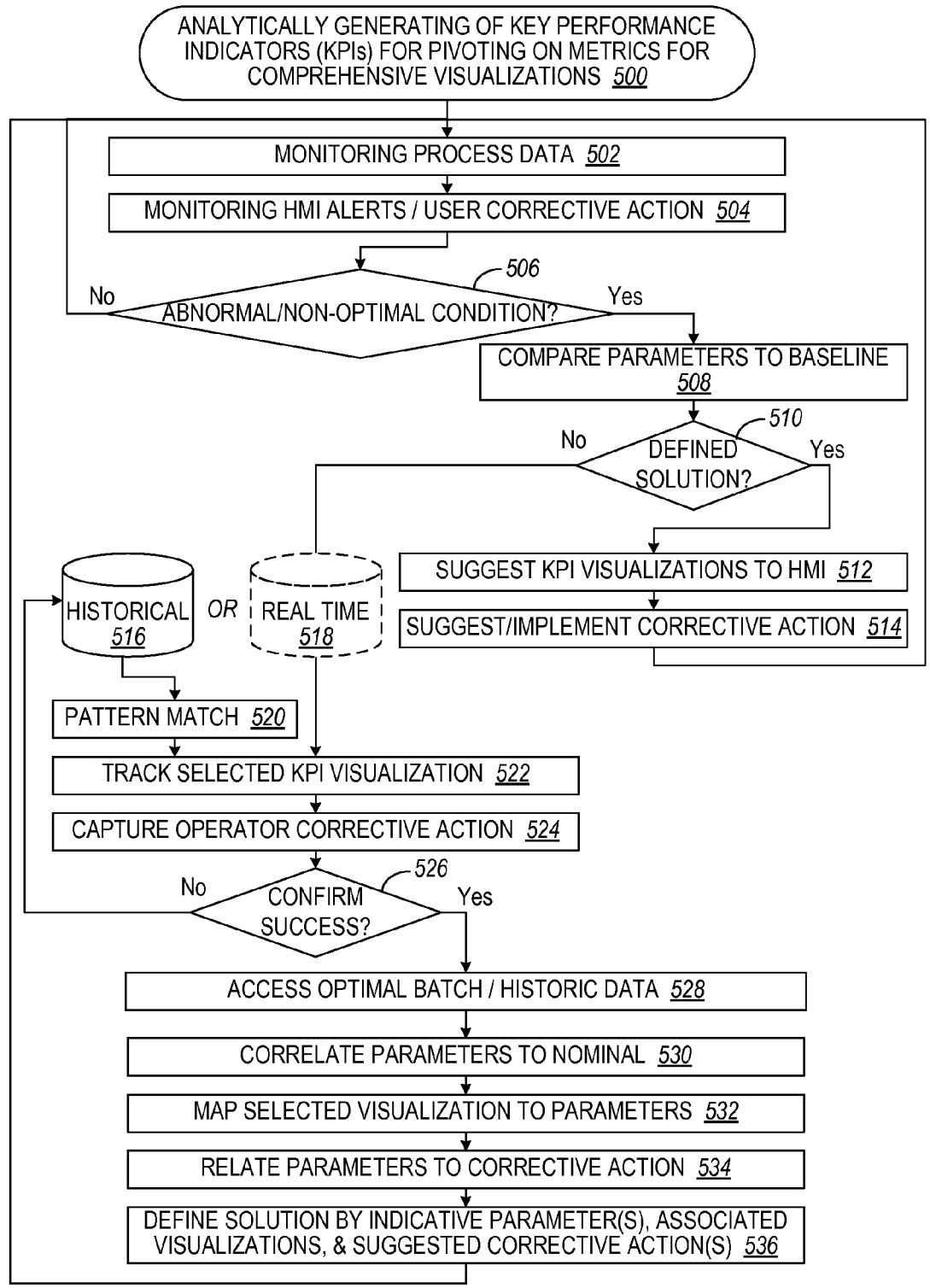
FIG. 5 illustrates a flow diagram of a methodology for analytically generating KPIs for pivoting on metrics for comprehensive visualizations that retroactively or prospectively utilizes historical data.

With reference to FIG. 5, a methodology 500 is depicted for analytically generating key performance indicators (KPI) for pivoting on metrics for comprehensive visualizations. In block 502, process data is monitored, which can comprise fixed context data recognized for use in KPI visualizations. Analytics can detect a problem based solely or in part upon this process data. In block 504, HMI alerts or user corrective actions are monitored in order to detect occurrence of a problem. In block 506, a determination is made that an abnormal/non-optimal condition exists that warrants correction. This determination can comprise flexible context process data defined by the user that requires operator evaluation for interpretation of import. In which case, recognition of a problem requiring corrective action can entail a retroactive determination based upon such non-routine control inputs. The determination can entail a KPI recognized by the methodology, such as based upon the type of process being monitored. If no abnormal/not-optimal condition exists at block 506, processing returns to continuing monitoring at block 502.

If an abnormal/non-optimal condition exists, then the monitored parameter data is compared to a baseline. Based upon this comparison, a further determination is made in block 512 as to whether a defined solution has previously been learned by monitoring an experienced operator in a similar situation. If so, suggested KPI visualizations associated with the defined solution are provided to the HMI (block 512). The defined solution can further comprise a corrective action that can be suggested to the operator via the HMI or provided to an automated decision implementation component (block 514). Then processing returns to block 502 for further monitoring.

If no solution is defined, in one aspect the system can analyze retrospectively historical data in order to see if a solution exists, albeit not previously flagged within the system, depicted as accessing historical data storage 516. Alternatively or in addition, monitoring can proceed by monitoring real-time data 518 to see if an operator has sufficient expertise to diagnose the problem and implement a corrective action that can be learned by the system. If historical, then in block 520, pattern matching is performed in order to locate a similar occurrence. After block 520 or 518, then visualization used by the operator are tracked, such as KPIs selected and displayed (block 522). In block 524, corrective actions taken by the operator are captured. In block 526, a determination is made as to whether the corrective action is or was successful. The degree of success can increase a corresponding weighting for this investigative approach and corrective action. Thus, for multiple possible solutions, a best solution can be proposed or a weighting of possible solutions can be proposed.

In some implementations, the defined solution replicates this process, sequencing through the corresponding KPI visualizations. In the illustrative implementation, further analytical processing refines guidance. For instance, in block 528, baseline data (e.g., "golden batch" or a statistical nominal range of values) are accessed. Then in block 530 a comparison is made against what the parameter data is in the analyzed situation, in particular those KPIs viewed by the operator (block 532). A further correlation can be made between the corrective action and the parameter to confirm a pre-existing association or an empirical relationship (block 534). Values and configuration details that depart from the expected can be thus weighted more heavily as being inferred as indicative of the problem. With the enhanced analytics, a defined solution can comprise a combination or parameters that are indicative of the problem, one or more visualizations that can guide an operator to diagnosing the condition, and one or more weighted recommendations for corrected actions based on learning from experienced operators. Operator actions that do not restore normal or optimum performance can further be noted for guiding operators who would otherwise resort to the same ill-advised approach, in particular if these attempts at corrective action exacerbated the condition or delayed correct diagnosis.

Figure 6:
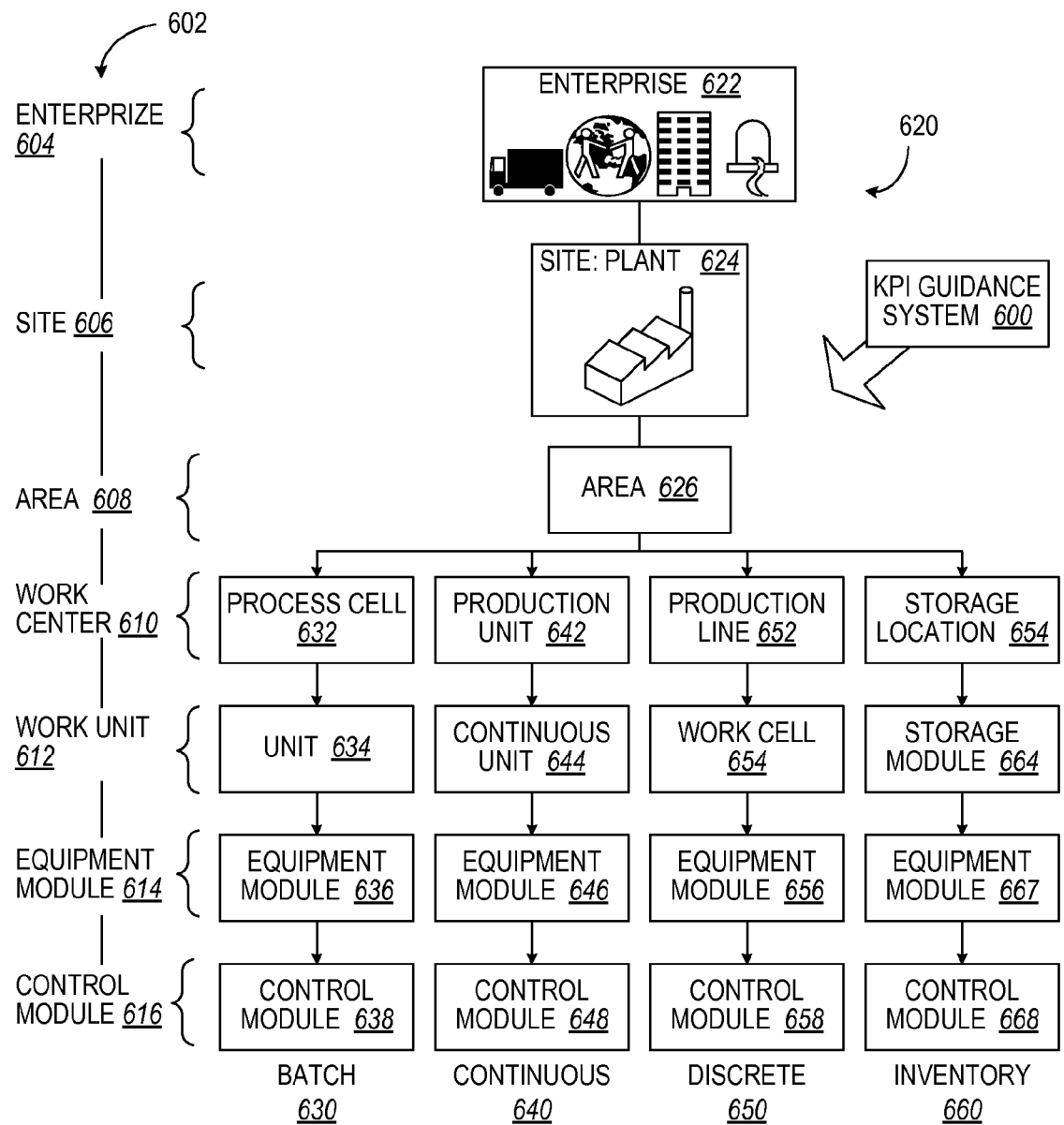
FIG. 6 illustrates a block diagram of an enterprise industrial process hierarchy.

With reference to FIG. 6, a KPI guidance system 600 can span an industrial process having a distributed and hierarchical structure. Hierarchical representations that can be employed in connection with a schema employed by programmable logic controllers to facilitate use of a hierarchically structured data model are illustrated. The hierarchies illustrated in this figure relate to equipment hierarchies, which can be integrated with procedure hierarchies to generate a robust representation of a plant (which is incorporated within a schema for use in connection with industrial controllers). A general hierarchy 602 entails an enterprise level 604, a site level 606, an area level 608, a work center level 610, a work unit level 612, an equipment module level 614, and a control module level 616. In an illustrative aspect, an industrial process 620 has an enterprise level 622, a site level 624, and an area level 626 that further breaks down into four disparate types of sub-hierarchies. For instance, a first hierarchy 630 in accordance with a batch process can further include a representation of a process cell 632, unit 634, equipment module 636, and control module 638. In contrast, a hierarchical representation 640 of equipment within a continuous process can include representations of a production unit 642, continuous unit 644, equipment module 646, and control module 648. A third hierarchy 650 of equipment in accordance with a discrete system can further include a representation of a production line 652, a work cell 654, equipment module 656, and control module 658. A fourth hierarchy 660 of equipment in accordance with an inventory process can further include a storage location 662, a storage module 664, equipment module 667, and control module 668.

For example, the enterprise 622 can represent an entirety of a company, the site 624 can represent a particular plant, an area can represent a portion of the plant, the process cell 632 can include equipment utilized to complete a process, a unit 634 can relate to a unit of machinery within the process cell 632, an equipment module 636 can include a logical representation of portions of the process cell 632, and the control module 638 can include basic elements, such as motors, valves, and the like. Furthermore, equipment modules 636 can include equipment modules and control modules can include control modules. Thus, as can be discerned from the figure, four disparate hierarchical representations can be employed to represent equipment within batch processes, continuous processes, discrete processes, and inventory.

For purposes of consistent terminology, data objects can be associated with metadata indicating which type of process they are associated with. Therefore, data objects can be provided to an operator in a form that is consistent with normal usage within such process. For example, batch operators can utilize different terminology than a continuous process operator (as shown by the hierarchy 650). Metadata can be employed to enable display of such data in accordance with known, conventional usage of such data. Thus, implementation of a schema in accordance with the hierarchy 620 will be seamless to operators. Furthermore, in another example, only a portion of such representation can be utilized in a schema that is utilized by a controller. For instance, it may be desirable to house equipment modules and control modules within a controller. In another example, it may be desirable to include data objects representative of work centers and work units within a controller (but not equipment modules or control modules). The claimed subject matter is intended to encompass all such deviations of utilizing the hierarchy 620 (or similar hierarchy) within a controller.

Figure 7:
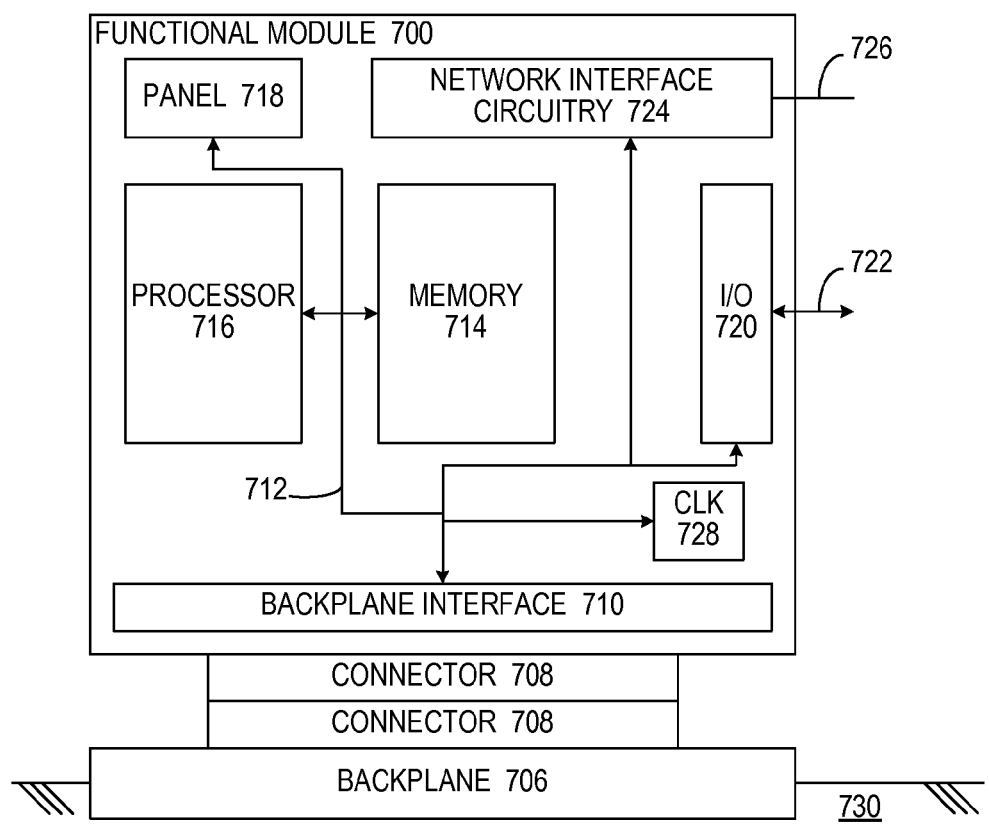
FIG. 7 illustrates a block diagram of a functional module for performing at least a part of a KPI guidance system for comprehensive visualizations.

FIG. 7 illustrates an exemplary environment, depicted as a functional model 700, that can perform data capture, network interface, KPI guidance processing, or HMI visualization in accordance with various aspects of the subject innovation. Each functional module 700 is attached to a backplane 706 of an industrial process system 730 by means of a separable electrical connector 708 that permits the removal of the module 700 from the backplane 706 so that it may be replaced or repaired without disturbing other modules 700. The backplane 706 provides the module 700 with both power and a communication channel to other modules 700. Local communication with other modules 700 through the backplane 706 is accomplished by means of a backplane interface 710 which electrically connects the backplane 706 through connector 708. The backplane interface 710 monitors messages on the backplane 706 to identify those messages intended for the particular module 700, based on a message address being part of the message and indicating the message destination. Messages received by the backplane interface 710 are conveyed to an internal bus 712 in the module 700.

The internal bus 712 joins the backplane interface 710 with a memory 714, a microprocessor 716, front panel circuitry 718, I/O interface circuitry 720 to industrial controller 722 and communication network interface circuitry 724 to an industrial network 726. The microprocessor 716 can be a general purpose microprocessor providing for the sequential execution of instructions included within the memory 714 and the reading and writing of data to and from the memory 714 and the other devices associated with the internal bus 712. The microprocessor 716 includes an internal clock circuit (not shown) providing the timing of the microprocessor 716 but may also communicate with an external clock 728 of improved precision. This clock 728 may be a crystal controlled oscillator or other time standard including a radio link to an external time standard. The precision of the clock 728 may be recorded in the memory 714 as a quality factor. The panel circuitry 718 includes status indication lights such as are well known in the art and manually operable switches such as for locking the module 700 in the off state.

The memory 714 can comprise control programs or routines executed by the microprocessor 716 to provide control functions, as well as variables and data necessary for the execution of those programs or routines. For I/O modules, the memory 714 may also include an I/O table holding the current state of inputs and outputs received from and transmitted to the industrial controller 710 via the I/O modules 720. The module 700 can be adapted to perform the various methodologies of the innovation, via hardware configuration techniques and/or by software programming techniques.

Figure 8:
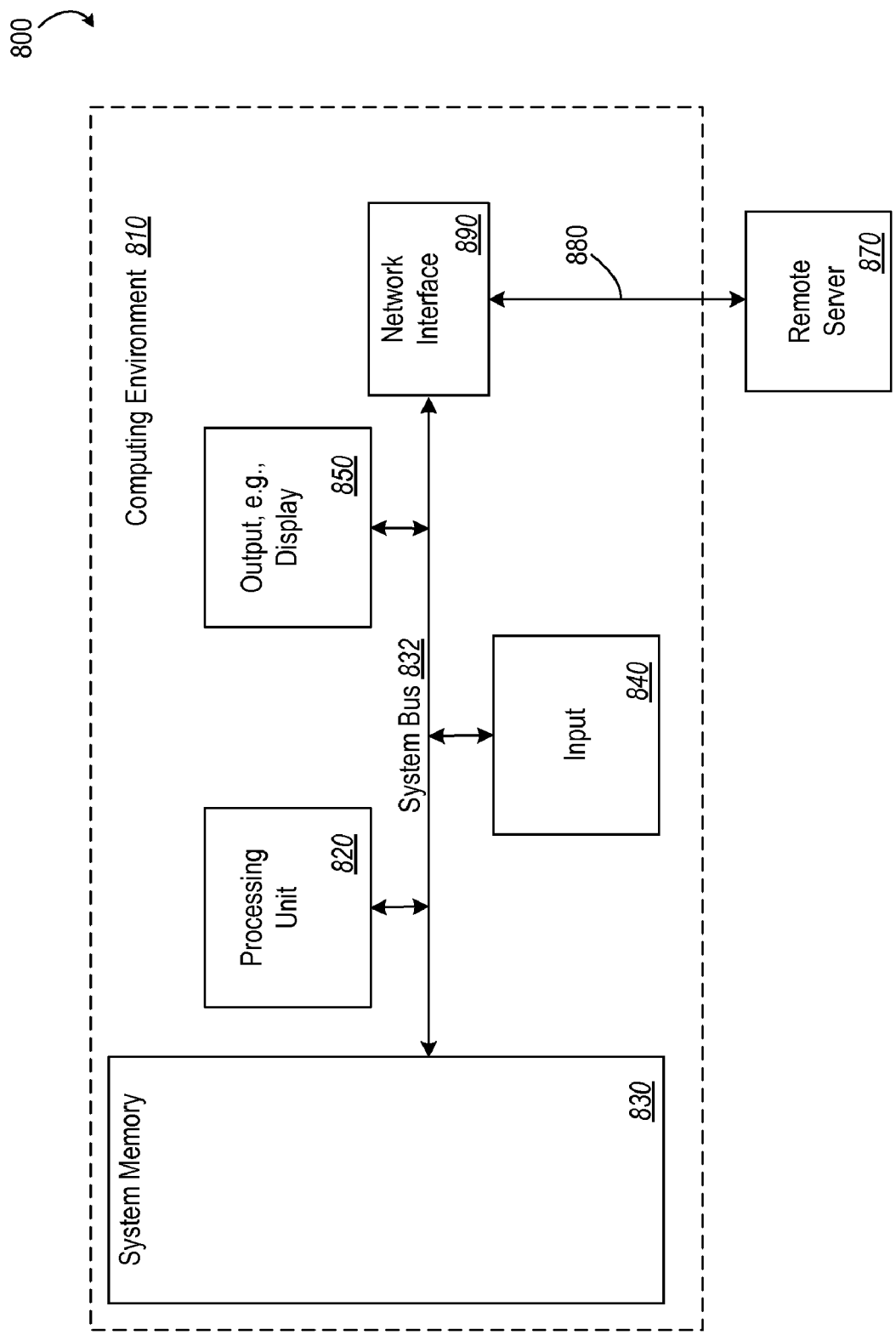
FIG. 8 illustrates an aspect of the visualization system depicting a typical computing environment.

FIG. 8 thus illustrates an example of a suitable computing system environment 800 in which the claimed subject matter may be implemented, although as made clear above, the computing system environment 800 is only one example of a suitable computing environment for a mobile device and is not intended to suggest any limitation as to the scope of use or functionality of the claimed subject matter. Further, the computing environment 800 is not intended to suggest any dependency or requirement relating to the claimed subject matter and any one or combination of components illustrated in the example operating environment 800.

With reference to FIG. 8, an example of a remote device for implementing various aspects described herein includes a general purpose computing device in the form of a computer 810. Components of computer 810 can include, but are not limited to, a processing unit 820, a system memory 830, and a system bus 832 that couples various system components including the system memory to the processing unit 820. The system bus 832 can be any of several types of bus structures including a memory bus or memory controller, a peripheral bus, and a local bus using any of a variety of bus architectures.

Computer 810 can include a variety of computer readable media. Computer readable media can be any available media that can be accessed by computer 810. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media can embody computer readable instructions, data structures, program modules or other data in a modulated data signal such as a carrier wave or other transport mechanism and can include any suitable information delivery media.

The system memory 830 can include computer storage media in the form of volatile and/or nonvolatile memory such as read only memory (ROM) and/or random access memory (RAM). A basic input/output system (BIOS), containing the basic routines that help to transfer information between elements within computer 810, such as during start-up, can be stored in memory 830. Memory 830 can also contain data and/or program modules that are immediately accessible to and/or presently being operated on by processing unit 820. By way of non-limiting example, memory 830 can also include an operating system, application programs, other program modules, and program data.

The computer 810 can also include other removable/non-removable, volatile/nonvolatile computer storage media. For example, computer 810 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 832 through a non-removable memory interface such as an interface, and a magnetic disk drive or optical disk drive can be connected to the system bus 832 by a removable memory interface, such as an interface.

A user can enter commands and information into the computer 810 through input devices (not shown) such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 820 through user input 840 and associated interface(s) that are coupled to the system bus 832, but can be connected by other interface and bus structures, such as a parallel port, game port or a universal serial bus (USB). A graphics subsystem can also be connected to the system bus 832. In addition, a monitor or other type of display device can be connected to the system bus 832 via an interface, such as output interface 850, which can in turn communicate with video memory. In addition to a monitor, computers can also include other peripheral output devices, such as speakers and/or a printer, which can also be connected through output interface 850.

The computer 810 can operate in a networked or distributed environment using logical connections to one or more other remote computers, such as remote server 870, which can in turn have media capabilities different from device 810. The remote server 870 can be a personal computer, a server, a router, a network PC, a peer device or other common network node, and/or any other remote media consumption or transmission device, and can include any or all of the elements described above relative to the computer 810. The logical connections depicted in FIG. 8 include a network 880, such local area network (LAN) or a wide area network (WAN), but can also include other networks/buses. Such networking environments are commonplace in homes, offices, enterprise-wide computer networks, intranets and the Internet.

When used in a LAN networking environment, the computer 810 is connected to the LAN 880 through a network interface or adapter 890. When used in a WAN networking environment, the computer 810 can include a communications component, such as a modem, or other means for establishing communications over the WAN, such as the Internet. A communications component, such as a modem, which can be internal or external, can be connected to the system bus 832 via the user input interface at input 840 and/or other appropriate mechanism. In a networked environment, program modules depicted relative to the computer 810, or portions thereof, can be stored in a remote memory storage device. It should be appreciated that the network connections shown and described are exemplary and other means of establishing a communications link between the computers can be used.

Figure 9:
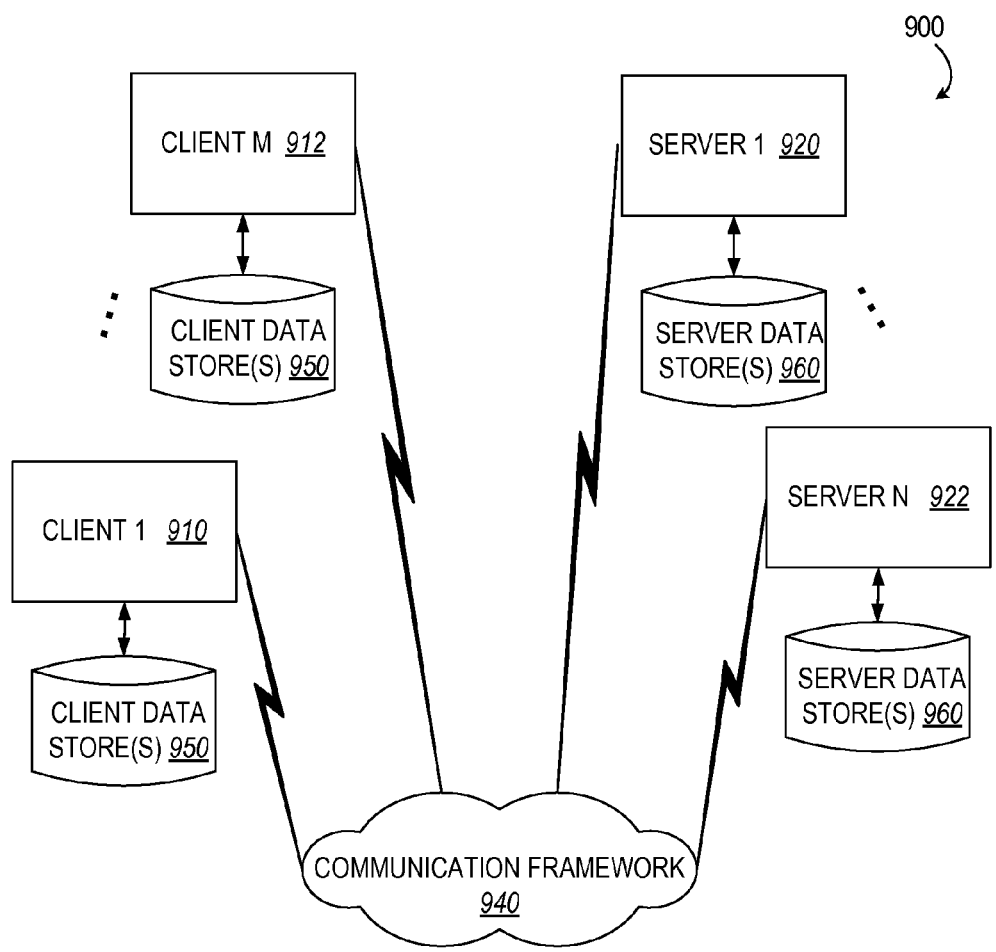
FIG. 9 illustrates an aspect of the visualization system depicting the interaction between KPI clients and KPI servers.

FIG. 9 is a schematic block diagram of a sample-computing environment 900 within which the disclosed and described components and methods can be used. The environment 900 includes one or more client(s) 910, 912. The client(s) 910, 912 can be hardware and/or software (e.g., threads, processes, computing devices). The environment 900 also includes one or more server(s) 920, 922. The server(s) 920, 922 can be hardware and/or software (for example, threads, processes, computing devices). The server(s) 920, 920 can house threads or processes to perform transformations by employing the disclosed and described components or methods, for example. Specifically, one component that can be implemented on the server 920, 922 is a security server. Additionally, various other disclosed and discussed components can be implemented on the server 920, 922.

One possible means of communication between a client 910, 912 and a server 920, 922 can be in the form of a data packet adapted to be transmitted between two or more computer processes. The environment 900 includes a communication framework 940 that can be employed to facilitate communications between the client(s) 910 and the server(s) 920. The client(s) 910, 912 are operably connected to one or more client data store(s) 950 that can be employed to store information local to the client(s) 910. Similarly, the server(s) 920, 922 are operably connected to one or more server data store(s) 960 that can be employed to store information local to the server(s) 920, 922.

The plurality of client systems 910, 912 can operate collaboratively based on their communicative connection. For instance, as described previously, a KPI guidance system 100 (FIG. 1) can transmit a defined solution model to a plurality of HMIs 110 (FIG. 1) to share the experience and knowledge of an operator with others. In another example, the KPI guidance systems 100 can operate in a series fashion, allowing an operators' communication received by KPI guidance client "1" 910, to the next client "2" (not shown), etc., to transmit the information to the next client "M" 912, which transmits the information to servers 920, 922.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various aspects described herein, it is to be understood that other similar aspects can be used or modifications and additions can be made to the described aspect(s) for performing the same or equivalent function of the corresponding aspect(s) without deviating therefrom. Still further, multiple processing chips or multiple devices can share the performance of one or more functions described herein, and similarly, storage can be effected across a plurality of devices. Accordingly, no single aspect shall be considered limiting, but rather the various aspects and their equivalents should be construed consistently with the breadth, spirit and scope in accordance with the appended claims.

While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

What is claimed is:

1. A method for guiding an operator of an industrial process by learning from expertise of another operator, the method comprising:
    accessing parameter data of an industrial process;
    accessing human-machine interface (HMI) data and correlating with the accessed parameter data;
    determining that the parameter data characterizes a problem warranting operator intervention in the industrial process;
    tracking a process visualization utilized by an operator and a subsequent control correction made by the operator;
    defining a solution comprising a key performance indicator (KPI) indicative of the problem as characterized; defining the solution further comprising:
        detecting a plurality of process HMI visualizations utilized by operator;
        comparing correction parameters presented by the plurality of process HMI visualizations against an optimum set of historical parameter data compiled from the parameter data; and
        weighting one of the plurality of process HMI visualizations for the solution including generating a weighted HMI visualization based on departure of a selected KPI in a presented HMI visualization from the optimum set of historical parameter data; and
    presenting the weighted HMI visualization for the KPI, and a control correction that addresses the KPI.

2. The method of claim 1, further comprising:
    monitoring parameter data of a real-time industrial process; and
    identifying a condition in the parameter data matching the solution.

3. The method of claim 2, further comprising prompting an HMI device to present the weighted HMI visualization associated with the KPI.

4. The method of claim 2, further comprising prompting an operator to perform the control correction addressing the KPI.

5. The method of claim 2, further comprising automatically causing the control correction addressing the KPI.

6. The method of claim 1, further comprising defining the solution by interacting with a real-time industrial process, wherein parameter and HMI data are stored.

7. The method of claim 1, further comprising defining a solution context for the solution by accessing historical parameter data and historical HMI data.

8. The method of claim 1, further comprising determining that the parameter data warranted operator intervention retroactively after detecting the control correction.

9. The method of claim 8, further comprising determining that the parameter data warranted the operator intervention by detecting an HMI alert to the operator.

10. The method of claim 8, further comprising selecting a HMI visualization for the context of the parameter data affected by the control correction.

11. The method of claim 1, further comprising:
storing parameter data comprising fixed context data defined a priori for HMI visualization control and comprising flexible context data selected for storage by an end user device; and
defining a solution based at least in part on the flexible context data.

12. The method of claim 1, further comprising:
interfacing to a disparate plurality of networked sources of parameter information; and
synchronizing the networked sources of the parameter information with the parameter data for correlation.

13. The method of claim 1, wherein the weighting is based on departure of a selected KPI in a presented HMI visualization from an optimum set of historical parameter data.

14. An apparatus for guiding an industrial process, comprising:
a first network interface configured to access and store parameter data of an industrial process;
a second network interface configured to access at least one human-machine interface (HMI) data correlated with the parameter data; and
a key performance indicator (KPI) guidance system configured to:
determine that the parameter data characterize a problem warranting operator intervention in the industrial process;
track a process visualization utilized by an operator and a subsequent control correction made by the operator; and
define a solution comprising a KPI indicative of the problem as characterized, wherein the KPI guidance system, to define the solution, is further configured to:
detect a plurality of visualizations selected by the operator;
compare parameters presented by the plurality of visualizations against an optimum set of historical data;
weight one of the plurality of visualizations based on departure of a selected KPI in a presented visualization from the optimum set;
define a visualization for the KPI; and
define a control correction that addresses the KPI.

15. The apparatus of claim 14, wherein the first and second network interfaces are further configured to monitor parameter data of the industrial process in real-time, and the KPI guidance system is further configured to identify a condition in the parameter data matching the solution in real-time.

16. The apparatus of claim 15, wherein the KPI guidance system is further configured to at least one of prompt an HMI device to present the visualization or prompt an operator to perform the control correction.

17. The apparatus of claim 14, wherein the KPI guidance system is further configured to define a context of the solution by accessing historical parameter data and historical HMI data.

18. The apparatus of claim 14, further comprising a historical data storage device configured to store parameter information and HMI data.

19. The apparatus of claim 14, wherein the KPI guidance system is configured to weight based on departure of a selected KPI in a presented visualization from a KPI set obtained when the industrial process is performing as required.

20. An industrial process system, comprising:
a process component configured to generate parameter data;
a human-machine interface (HMI) configured to display the parameter data and provide operator controls for the process component;
a storage device configured to retain historical parameter data and HMI data;
a first network interface configured to access real-time parameter data of an industrial process;
a second network interface configured to access in real-time the HMI data correlated with the historical parameter data; and
a key performance indicator (KPI) guidance system configured to communicate via the first and second network interfaces and further configured to:
determine that the real-time parameter data characterize a problem warranting operator intervention in the industrial process,
track a process HMI visualization utilized by an operator and a subsequent control correction made by the operator;
define a solution comprised of a KPI indicative of the problem as characterized, a solution HMI visualization for the KPI, and a control correction that addresses the KPI, wherein, to define the solution, the KPI guidance system is further configured to:
detect a plurality of process HMI visualizations selected by the operator;
compare parameters presented by the plurality of process HMI visualizations against an optimum set of the historical parameter data;
weight the plurality of process HMI visualizations to generate a plurality of weighted process HMI visualizations based on departure of a selected KPI in a presented HMI visualization from the optimum set; and
select based on the plurality of weighted process HMI visualizations a solution HMI visualization.

* * * * *